(12) United States Patent
Huang (10) Patent No.: US 8,714,755 B2
(45) Date of Patent: May 6, 2014

(54) PROJECTION LENS OF AN IMAGING MODULE AND IMAGING MODULE

(75) Inventor: June-Jei Huang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 245 days.

(21) Appl. No.: 13/296,749

(22) Filed: Nov. 15, 2011

(65) Prior Publication Data

US 2012/0147338 A1     Jun. 14, 2012

(30) Foreign Application Priority Data

Dec. 10, 2010 (TW) ................................ 99143166 A (51) Int. Cl.
| | |
|---|---|
| G03B 21/14 | (2006.01) |
| G03B 21/20 | (2006.01) |
| G03B 21/28 | (2006.01) |
| G03B 3/00 | (2006.01) |
| G03B 9/00 | (2006.01) |

(52) U.S. Cl.
USPC ............. 353/101; 353/81; 353/102; 359/648; 359/649; 359/650; 359/651

(58) Field of Classification Search
USPC ........................ 353/31, 33, 81, 100–102, 122; 359/648–651, 668–671, 708, 754–756, 359/763, 771, 784, 793; 348/744, 750, 348/758–759
See application file for complete search history.

(56) References Cited

U.S. PATENT DOCUMENTS

| | | | |
|---|---|---|---|
| 3,990,785 A * | 11/1976 | Hirose ........................... | 359/670 |
| 5,648,871 A | 7/1997 | Okuyama et al. | |
| 5,930,050 A | 7/1999 | Dewald | |
| 6,512,636 B2 | 1/2003 | Schauss | |
| 6,587,159 B1 | 7/2003 | Dewald | |
| 6,801,366 B2 * | 10/2004 | Hirata et al. .................. | 359/649 |
| 7,289,272 B2 | 10/2007 | Bowron et al. | |
| 7,457,044 B2 * | 11/2008 | Ohzawa et al. ............... | 359/671 |
| 7,885,008 B2 * | 2/2011 | Schauβ ......................... | 359/649 |

(Continued)

FOREIGN PATENT DOCUMENTS

| | | |
|---|---|---|
| CN | 1588155 A | 3/2005 |
| TW | 200951488 A1 | 12/2009 |

OTHER PUBLICATIONS

Office Action for Chinese Application No. 201010624722.6; Date of Mailing: Apr. 28, 2013; with English Translation.

(Continued)

*Primary Examiner* — Tony Ko
*Assistant Examiner* — Jori S Reilly-Diakun
(74) *Attorney, Agent, or Firm* — Cantor Colburn LLP (57) ABSTRACT

A projection lens of an imaging module and the imaging module are provided. The imaging module further has a light modulator to project a first image with a first aspect ratio. The projection lens comprises an anamorphic lens set and a projection lens set. The anamorphic lens set comprises a first cylinder lens, a second cylinder lens, a bi-convex cylinder lens and a bi-concave cylinder lens, which are set after the light modulator in sequence. The first cylinder lens has at least one flat surface, and the second cylinder lens has at least one convex surface. The anamorphic lens set projects the first image with the first aspect ratio into a second image with a second aspect ratio; the second aspect ratio is different from the first aspect ratio. The projection lens set receives and projects the second image with the second aspect ratio.

20 Claims, 7 Drawing Sheets

(56) References Cited

U.S. PATENT DOCUMENTS

| | | | |
|---|---|---|---|
| 7,889,431 B2 * | 2/2011 | Nagahara | 359/649 |
| 8,136,947 B2 * | 3/2012 | Phillips, III | 353/20 |
| 8,390,935 B2 * | 3/2013 | Nagahara | 359/680 |
| 2002/0154418 A1 * | 10/2002 | Shikama | 359/754 |
| 2004/0100590 A1 | 5/2004 | Childers | |
| 2009/0303444 A1 | 12/2009 | Huang | |
| 2010/0208149 A1 | 8/2010 | Morikuni | |
| 2013/0010370 A1 * | 1/2013 | Otani et al. | 359/668 |
| 2013/0010371 A1 * | 1/2013 | Otani et al. | 359/668 |
| 2013/0027676 A1 * | 1/2013 | Otani et al. | 353/97 |

OTHER PUBLICATIONS

Taiwanese Notice of Allowance for Taiwanese Application No. 099143166; Mailing Date: Sep. 11, 2011, with English Translation.

* cited by examiner

PROJECTION LENS OF AN IMAGING MODULE AND IMAGING MODULE

This application claims the benefit from the priority to Taiwan Patent Application No. 099143166 filed on Dec. 10, 2010, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a projection lens for an imaging module. More particularly, the present invention relates to a projection lens adapted to adjust an aspect ratio of an image and an imaging module using the projection lens.

2. Descriptions of the Related Art

With the development of science and technology, various display devices have been developed in succession. Projectors, due to their capability of changing a size of an image according to a service place, have become indispensable products for displaying image information when enterprises hold meetings or people enjoy top level audio visual entertainment programs. However, to meet different demands of users in a more comprehensive way, projectors capable of selectively providing an image of different aspect ratios have gradually gained popularity among consumers.

Figure 1:
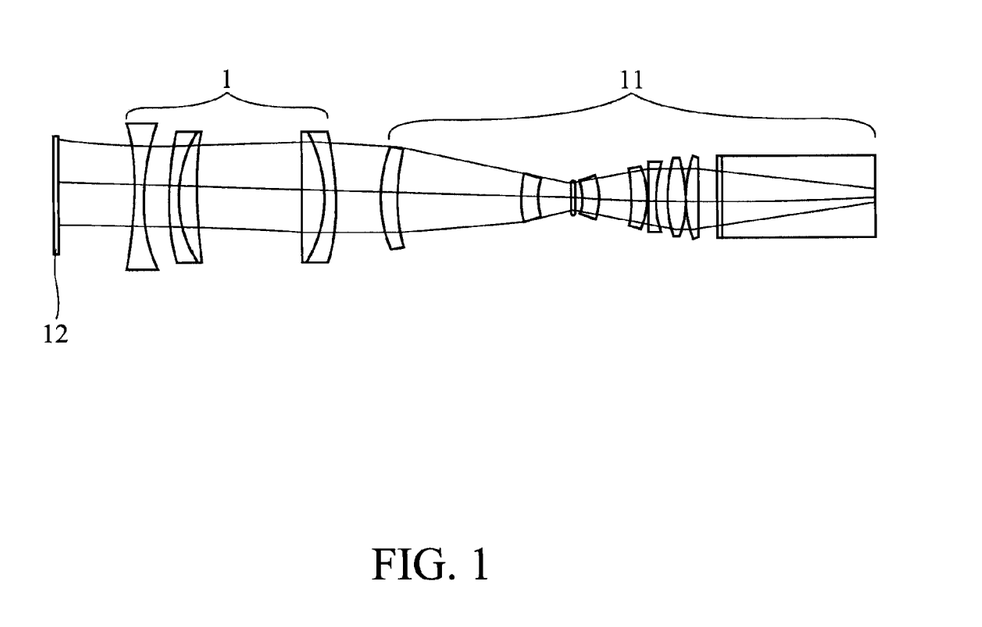
FIG. 1 is a schematic view of a conventional anamorphic lens set and a conventional projection lens.

Various optical structures have been developed in the art to enable an image projected by a projector to meet demands for different aspect ratios. Referring to FIG. 1, U.S. Pat. No. 5,930,050 discloses an anamorphic lens set 1 for displaying wide-screen images of different aspect ratios. The anamorphic lens set 1, which is of an independent optical mechanism, can be attached to an outer side of a projection lens 11 of a projection device through a slide rail. However, the anamorphic lens set 1 is disposed on a side of the projection lens 11 close to a screen 12 onto which an image is to be projected, and an angular range of light rays of the image has been expanded by the projection lens 11; therefore, if the light rays projected by the projection lens 11 are to be refracted completely and projected entirely onto the screen 12, the anamorphic lens set 1 must be made to have a large size, which indirectly adds to the overall weight. This makes it impossible to meet the demands for lightweight and slim projectors in the market.

Figure 2:
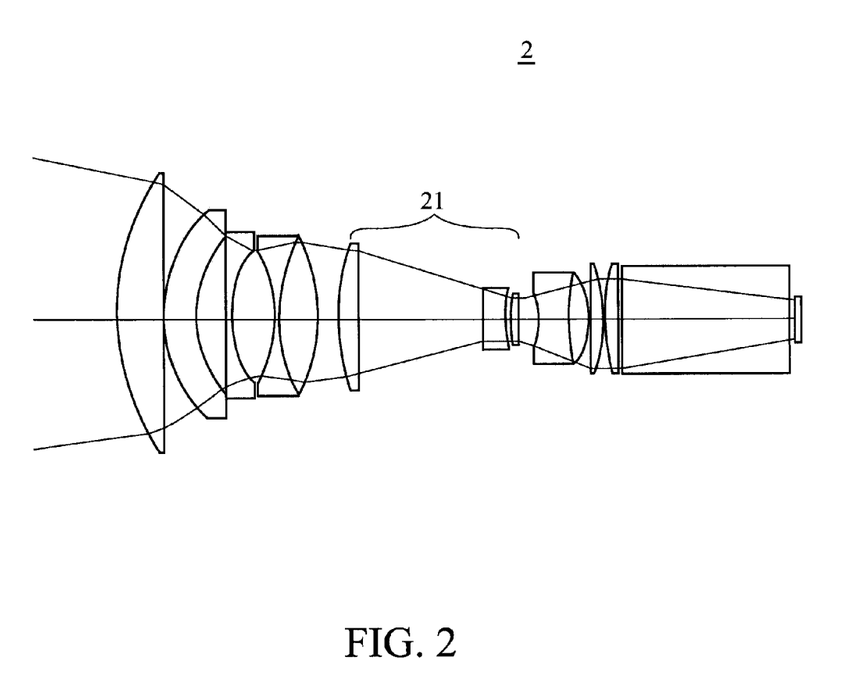
FIG. 2 is a schematic view of another conventional anamorphic lens set.

Referring to FIG. 2, U.S. Pat. No. 7,289,272 discloses a projection lens 2 comprising an anamorphic lens set 21. Compared with the aforesaid anamorphic lens set 1, the anamorphic lens set 21 has a much smaller size. However, the projection lens 2 is actually an integrated lens set; i.e., it is suitable for display of only a single aspect ratio and fails to meet the demands for different image aspect ratios.

Accordingly, an urgent need still exists in the art to provide a projection lens that is light weight, has a small volume and can easily switch between different image aspect ratios to meet demands of users when watching different contents.

SUMMARY OF THE INVENTION

An objective of the present invention is to provide a projection lens, which can easily switch between lens sets in the projection lens to accomplish miniaturization of a projection device and convenience in adjusting the aspect ratio of an image projected onto a screen.

To achieve the aforesaid objective, the present invention provides a projection lens for an imaging module. The imaging module has a light modulator and a projection lens. The light modulator processes a light beam to project a first image with a first aspect ratio, and the projection lens comprises an anamorphic lens set and a projection lens set. The anamorphic lens set comprises a first cylinder lens, a second cylinder lens, a bi-convex cylinder lens and a bi-concave cylinder lens disposed after the light modulator in sequence. The first cylinder lens has at least one flat surface. The second cylinder lens has at least one convex surface. The anamorphic lens set refracts the first image with the first aspect ratio into a second image with a second aspect ratio; the second aspect ratio is different from the first aspect ratio. The projection lens set receives and projects the second image with the second aspect ratio.

Accordingly, with the projection lens of the present invention, the aspect ratios of the image can be switched easily and the problem of an increased weight and volume of the projection device due to an overly complex lens design can be avoided.

DESCRIPTION OF THE PREFERRED EMBODIMENT

In the following description, the present invention will be explained with reference to the embodiments thereof. The present invention relates to a projection lens and an imaging module with the projection lens. Generally, the imaging module of the present invention is for use in a projection device. The projection device may be a digital light processing (DLP) projection display or any other apparatus with the projecting and displaying functions. The DLP projection display may be of a monolithic type or a triplet type. It shall be appreciated that in the following embodiments and the attached drawings, the description of these embodiments is only for the purpose of illustration rather than to limit the present invention. Moreover, in the following embodiments and the attached drawings, elements not directly related to the present invention are omitted from depiction; and dimensional relationships among individual elements in the attached drawings are illustrated only for ease of understanding but not to limit the actual scale.

Figure 3:
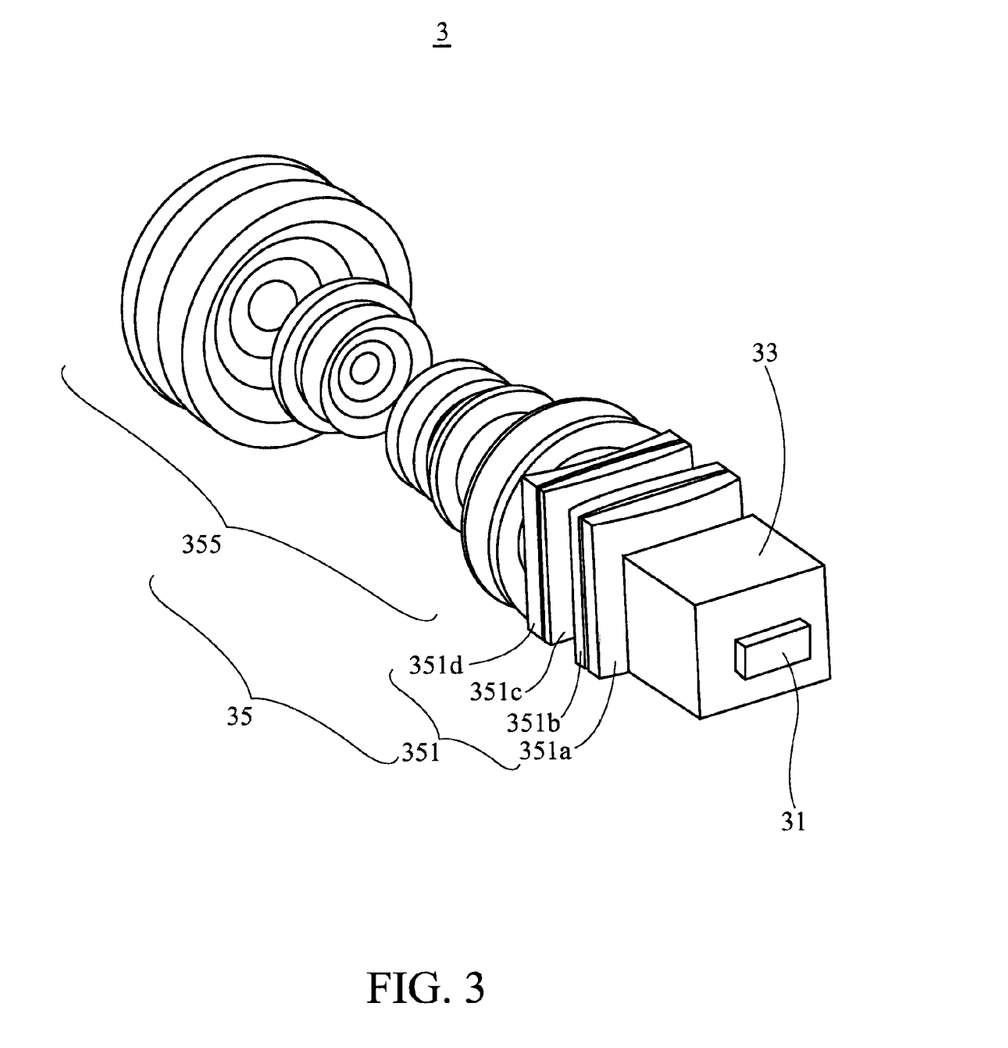
FIG. 3 is a schematic perspective view of an imaging module according to a preferred embodiment of the present invention.
Figure 4:
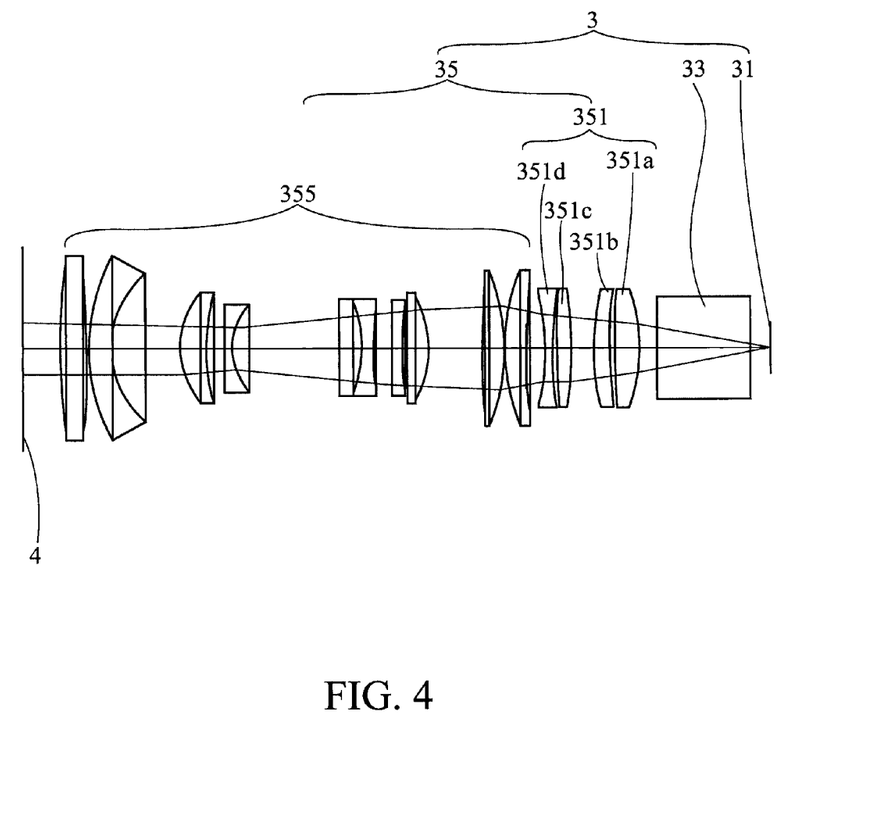
FIG. 4 is a schematic side view of a projection lens when an image with a second aspect ratio is displayed according to the preferred embodiment of the present invention.
Figure 5:
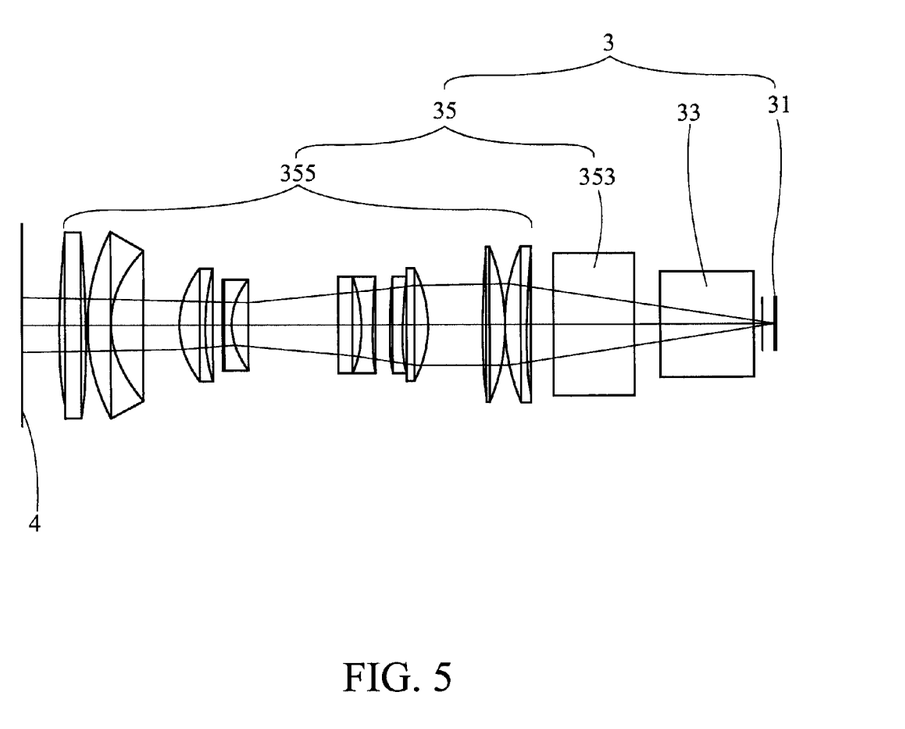
FIG. 5 is a schematic side view of the projection lens when an image with a first aspect ratio is displayed according to the preferred embodiment of the present invention.
Figure 6:
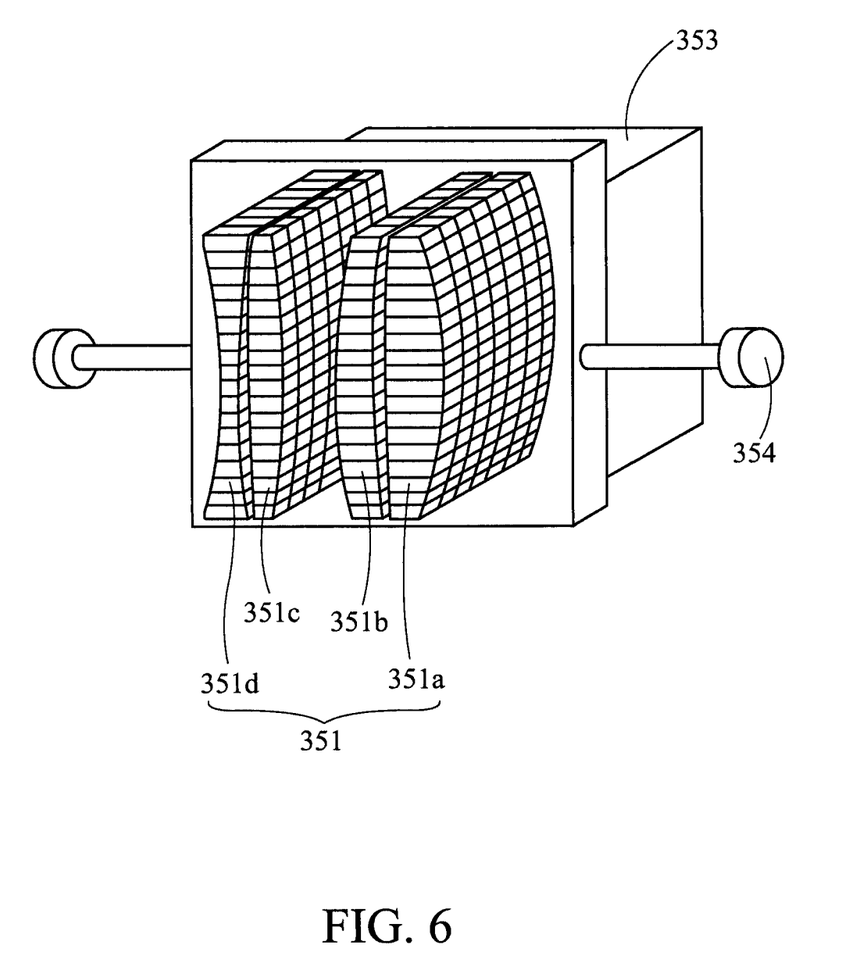
FIG. 6 is a schematic view of a switching mechanism according to the preferred embodiment of the present invention.

A preferred embodiment of the present invention is an imaging module 3. Referring to FIG. 3 to FIG. 6, FIG. 3 is a schematic perspective view of the imaging module 3 of this embodiment in a displaying status, FIG. 4 is a side view of the imaging module 3 in the displaying status shown in FIG. 3, FIG. 5 is a side view of the imaging module 3 of this embodiment in another displaying status, and FIG. 6 is a schematic view of a switching mechanism of this embodiment.

The imaging module 3 comprises a light modulator 31, a prism module 33 and a projection lens 35. The projection lens 35 comprises an anamorphic lens set 351, a substitute lens 353, a switching mechanism 354 and a projection lens set 355.

The light modulator 31 receives and processes a light beam provided by an illuminating module and then projects a first image with a first aspect ratio. The light modulator 31 of this embodiment is a spatial light modulator (SLM), and in particular a digital micromirror device (DMD). That is, the imaging module 3 of this embodiment is for use in a monolithic DLP projection device.

The prism module 33 is disposed between the light modulator 31 and the projection lens 35. In this embodiment, the prism module 33 is a total internal reflection prism (TIR prism) module.

Referring to FIGS. 3 to 6 together, the projection lens 35 comprises the anamorphic lens set 351, the substitute lens 353, the switching mechanism 354 and the projection lens set 355.

Referring to FIGS. 3, 4 and 6, the anamorphic lens set 351 comprises a first cylinder lens 351a, a second cylinder lens 351b, a bi-convex cylinder lens 351c and a bi-concave cylinder lens 351d disposed after the light modulator 31 and the prism module 33 in sequence. The first cylinder lens 351a is a flat-convex cylinder lens, and has a flat surface disposed to face the second cylinder lens 351b. The second cylinder lens 351b is a concave-convex cylinder lens, and has a convex surface disposed to face the bi-convex cylinder lens 351c. The anamorphic lens set of the present invention has a specific anamorphic factor; a preferred value of which ranges from 1.2 to 1.5. In this embodiment, the anamorphic factor of the anamorphic lens set 351 is 1.32.

Based on the principle of the present invention, other examples of the anamorphic lens set may also adopt cylinder lenses different from those described above. For example, the first cylinder lens may be replaced by a flat-concave cylinder lens instead, so it is only necessary that the first cylinder lens has a flat surface disposed to face the second cylinder lens; the second cylinder lens may be replaced by a bi-convex cylinder lens instead, so it is only necessary that the second cylinder lens has a convex surface disposed to face the bi-convex cylinder lens.

As shown in FIG. 5 and FIG. 6, the substitute lens 353 is substantially a dummy lens, which has no influence on the traveling direction of the light and on the optical properties of the image. In this embodiment, the substitute lens 353 is made of glass; however, in other examples, the substitute lens 353 may also be made of other materials.

Referring to FIG. 6, the switching mechanism 354 is adapted to connect the anamorphic lens set 351 and the substitute lens 353 to switch to select either the anamorphic lens set 351 or the substitute lens 353 for operation. In this embodiment, the switching mechanism 354 is a rotating shaft. Therefore, through the rotation of the rotating shaft, either the anamorphic lens set 351 or the substitute lens 353 can be selected for operation.

Figure 7:
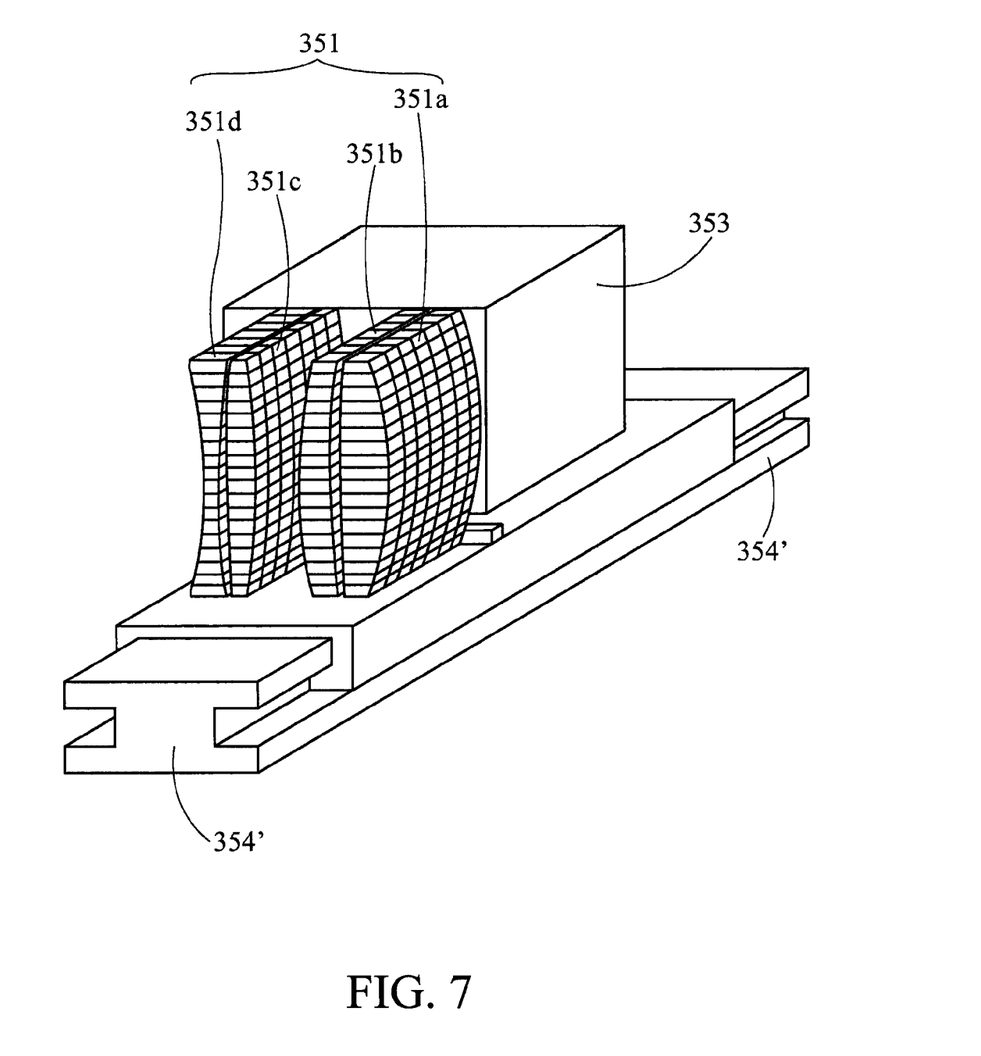
FIG. 7 is a schematic view of the switching mechanism according to other embodiments of the present invention.

In other examples, the switching mechanism may also be a slide rail. FIG. 7 is a schematic view of the switching mechanism which is a slide rail 354'. The slide rail 354' is pushed back and forth in a defined direction to switch to select one of the anamorphic lens set 351 and the substitute lens 353 for operation. In actual application, the switching mechanism may comprise at least one roller on the slide rail, a turret, or a combination thereof; those of ordinary skill in the art may also replace it with other designs, and there is no limitation thereon.

In the preferred embodiment, the projection lens set 355 is formed of ten spherical lenses, and has a long back focal length which is longer than a total length of the prism module 33 and the substitute lens 353.

Hereinafter, the operation mechanism of the projection lens 35 of this embodiment will be described in detail.

Referring to FIGS. 4 and 5 in more detail, FIG. 4 is schematic side view of the projection lens 35 when an image with a second aspect ratio is displayed according to this embodiment, and FIG. 5 is a schematic side view of the projection lens 35 when an image with a first aspect ratio is displayed according to this embodiment.

Firstly, the light modulator 31 processes a light beam from an illuminating module (not shown) and projects the first image with the first aspect ratio. The first image with the first aspect ratio passes through the prism module 33 and is then received by the projection lens 35.

As shown in FIG. 4, when the anamorphic lens set 351 is selected for operation by the switching mechanism 354, the anamorphic lens set 351 refracts the first image with the first aspect ratio into a second image with a second aspect ratio. Then, the projection lens set 355 receives and projects the second image with the second aspect ratio onto the screen 4. The aforesaid second aspect ratio is different from the first aspect ratio.

In this embodiment, the first aspect ratio is 16:9, and the second aspect ratio is 2.35:1; i.e., the anamorphic lens set 351 magnifies the first image with the first aspect ratio of 16:9 by 1.32 times in the horizontal direction (the anamorphic factor of the anamorphic lens set 351 is 1.32 in this embodiment) to form the second image with the second aspect ratio of 2.35:1. In actual application, the first aspect ratio may be either 16:9, 4:3 and 2.35:1; the second aspect ratio may be either 16:9, 4:3 and 2.35:1 but is different from the first aspect ratio. It shall be particularly noted herein that the first image with the first aspect ratio and the second image with the second aspect ratio have the same height or width.

As shown in FIG. 5, similarly, if the substitute lens 353 is selected for operation by the switching mechanism 354, then, because the substitute lens 353 has no influence on the first image with the first aspect ratio, the first image with the first aspect ratio generated through processing by the light modulator 31 will be projected onto the screen 4 still with the first aspect ratio by the projection lens set 355 after passing through the substitute lens 353.

Upon reviewing the aforesaid embodiments, people skilled in the art may proceed with other embodiments. According to the present invention, images of different ratios can be projected by simply switching between the anamorphic lens set and the substitute lens of the projection lens set. Furthermore, the projection lens set of the present invention is easy to produce and assemble at a low cost due to its simple elements and structure, small volume and light weight; all of these characteristics satisfy the requirements in the art and the market.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection lens for an imaging module, the imaging module having a light modulator, and the light modulator projecting a first image with a first aspect ratio, the projection lens comprising:
   an anamorphic lens set, comprising a first cylinder lens, a second cylinder lens, a bi-convex cylinder lens and a bi-concave cylinder lens disposed after the light modulator in sequence, the first cylinder lens having at least one flat surface, the second cylinder lens having at least one convex surface, the anamorphic lens set refracting the first image with the first aspect ratio into a second image with a second aspect ratio, and the second aspect ratio being different from the first aspect ratio; and
   a projection lens set, receiving and projecting the second image with the second aspect ratio.

2. The projection lens as claimed in claim 1, wherein the first cylinder lens is a flat-convex cylinder lens or a flat-concave cylinder lens, the at least one flat surface of the first cylinder lens is disposed to face the second cylinder lens, the second cylinder lens is a concave-convex cylinder lens or a bi-convex cylinder lens, and the at least one convex surface of the second cylinder lens is disposed to face the bi-convex cylinder lens.

3. An imaging module, comprising:
   a light modulator, processing a light beam to project a first image with a first aspect ratio; and
   a projection lens, having;
      an anamorphic lens set, comprising a first cylinder lens, a second cylinder lens, a bi-convex cylinder lens and a bi-concave cylinder lens disposed after the light modulator in sequence, the first cylinder lens having at least one flat surface, the second cylinder lens having at least one convex surface, the anamorphic lens set refracting the first image with the first aspect ratio into a second image with a second aspect ratio, and the second aspect ratio being different from the first aspect ratio; and
      a projection lens set, receiving and projecting the second image with the second aspect ratio.

4. The imaging module as claimed in claim 3, wherein the first cylinder lens is a flat-convex cylinder lens or a flat-concave cylinder lens.

5. The imaging module as claimed in claim 4, wherein the at least one flat surface of the first cylinder lens is disposed to face the second cylinder lens.

6. The imaging module as claimed in claim 3, wherein the second cylinder lens is a concave-convex cylinder lens or a bi-convex cylinder lens.

7. The imaging module as claimed in claim 6, wherein the at least one convex surface of the second cylinder lens is disposed to face the bi-convex cylinder lens.

8. The imaging module as claimed in claim 3, wherein the anamorphic lens set has an anamorphic factor between 1.2 and 1.5.

9. The imaging module as claimed in claim 8, wherein the anamorphic factor is 1.32.

10. The imaging module as claimed in claim 3, wherein the first image with the first aspect ratio and the second image with the second aspect ratio have the same height or width.

11. The imaging module as claimed in claim 10, wherein the first aspect ratio is one of 16:9, 4:3 and 2.35:1.

12. The imaging module as claimed in claim 11, wherein the second aspect ratio is one of 16:9, 4:3 and 2.35:1.

13. The imaging module as claimed in claim 3, wherein the projection lens further comprises a substitute lens and a switching mechanism, the switching mechanism connects the substitute lens and the anamorphic lens set, and the switching mechanism switches to select one of the substitute lens and the anamorphic lens set for operation in the imaging module.

14. The imaging module as claimed in claim 13, wherein the first image is projected to a screen with the first aspect ratio when the substitute lens is selected for operation, and the second image is projected to the screen with the second aspect ratio when the anamorphic lens set is selected for operation.

15. The imaging module as claimed in claim 13, wherein the switching mechanism comprises a slide rail or a rotating shaft.

16. The imaging module as claimed in claim 13, further comprising a prism module disposed between the light modulator and the anamorphic lens set of the projection lens.

17. The imaging module as claimed in claim 16, wherein the prism module is a total internal reflection prism (TIR prism) module.

18. The imaging module as claimed in claim 3, wherein the light modulator is a spatial light modulator (SLM).

19. The imaging module as claimed in claim 18, wherein the light modulator is at least one digital micromirror device (DMD).

20. The imaging module as claimed in claim 16, wherein the projection lens set has a long back focal length, and the long back focal length is longer than a total length of the substitute lens and the prism module.

* * * * *